United States Patent [19]

Ogawa et al.

[11] Patent Number: 5,548,171
[45] Date of Patent: Aug. 20, 1996

[54] DIRECT-CURRENT MOTOR

[75] Inventors: Yoshihiro Ogawa; Keisaku Zenmei; Shuzo Isozumi, all of Himeji, Japan

[73] Assignee: Mitsubishi Denki Kabushiki Kaisha, Tokyo, Japan

[21] Appl. No.: 385,840

[22] Filed: Feb. 9, 1995

[30] Foreign Application Priority Data

Sep. 16, 1994 [JP] Japan .................................. 6-221812

[51] Int. Cl.$^6$ ........................................................ H02K 21/26
[52] U.S. Cl. ............................. 310/154; 310/216; 310/261
[58] Field of Search ..................................... 310/154, 254, 310/261, 216

[56] References Cited

U.S. PATENT DOCUMENTS

| 4,823,037 | 4/1989 | Abukawa | 310/154 |
| 4,918,830 | 4/1990 | Aso | 310/154 |
| 5,083,054 | 1/1992 | Tomite | 310/154 |

FOREIGN PATENT DOCUMENTS

| 0096868 | 12/1983 | European Pat. Off. | |
| 517783 | 3/1993 | Japan | H02K 23/04 |

*Primary Examiner*—R. Skudy
*Attorney, Agent, or Firm*—Sughrue, Mion, Zinn, Macpeak & Seas; Richard C. Turner

[57] ABSTRACT

A direct-current motor is provided with a field pole including a main magnetic pole having an axial length of Lm and an auxiliary magnetic pole; and an armature core which is rotatably supported opposite to the inner peripheral side of the main magnetic pole and rotated by the excitation force of the field pole and has an axial length of Lc. The direct-current motor which satisfies the relation of Lm>Lc is such that the corner portions of the main magnetic pole are formed so that the relation between the axial length Ln of the straight section of the main magnetic pole and Lc satisfies 1.15 Lc>Ln≧Lc. Therefore, a direct-current motor can be made more lightweight without changing its output characteristics by cutting down the corner portions of the main magnetic pole.

4 Claims, 3 Drawing Sheets

Ln: LENGTH OF SIDE STRAIGHT SECTION OF MAIN MAGNETIC POLE
Lc: AXIAL LENGTH OF ARMATURE CORE

R: AXIAL LENGTH OF CHAMFERING OR CORNER
Lm: AXIAL LENGTH OF MAIN MAGNETIC POLE

DIRECT-CURRENT MOTOR

BACKGROUND OF THE INVENTION

The present invention relates to a direct-current motor and more particularly to its field device.

FIGS. 4A and 4B are block diagrams of a field device for a conventional direct-current motor. FIG. 4A is a side sectional view and FIG. 4B is a bottom view.

In FIGS. 4A and 4B, reference numeral 1 denotes the whole field device for a magneto direct-current motor; 2, a yoke; and 3, a field pole which is formed from a magnet secured to the inner peripheral face of the yoke 2, the field pole comprising a main magnetic pole 4 made of a ferrite permanent magnet secured on the demagnetizing side (the rear side in the direction of rotation) and an auxiliary magnetic pole 5 made of soft iron or soft ferrite secured on the magnetizing side (the front side in the direction of rotation). Further, a reference numeral 6 denotes an armature core which is located on the inner peripheral side of the field device 1 opposite to the field pole 3 and on which the excitation force of the field pole 3 acts, the main magnetic pole 4 overhanging the armature core 6; 7, an armature including the armature core 6; and 8, corner portions respectively formed in the overhanging sections of the main magnetic pole 4. Further, Lm represents the axial length of the main magnetic pole 4; Ln, the axial length of the straight section of the main magnetic pole 4; Lc, the axial length of the armature core 6; and R, the axial length of the corner (roundness) formed in the corner portion 8 or an axial chamfer dimension. Although the axial length Ln of the straight section of the main magnetic pole 4 is substantially equal to the length Lm of the magnet, and the magnet has a rounding at each corner portion 8 to prevent the magnet from chipping when it is assembled.

When the armature 7 supported on the inner periphery of the field pole 3 in the field device for the conventional magneto direct-current motor above is supplied with power, it is subject to the excitation force of the main magnetic pole 4 and rotates.

In this case, improvement in performance is to be made by justifying Lm>Lc since the main magnetic pole 4 is a ferrite magnet.

Improvement in performance has thus been attempted by making the main magnetic pole 4 overhang the armature core 6 in such a conventional device. However, the magnetic flux in the neighborhood of the overhanging corner portions is not actually working effectively and these portions have been left as being useless; the problem is that these corner portions have accordingly resulted in not only increasing the weight of the device but also making it costly.

SUMMARY OF THE INVENTION

An object of the present invention made to solve the foregoing problems is to provide a direct-current motor which can be made lightweight and less costly as the weight of a ferrite permanent magnet decreases while its output characteristics are equally maintained as usual.

A direct-current motor according to the present invention comprises a main magnetic pole having an axial length of Lm, inclusive of the axial length Ln of a straight section, the main magnetic pole having corner portions which are respectively located at both ends of the straight section, and an armature core which is rotatably supported opposite to the main magnetic pole and has an axial length Lc which is shorter than the axial length Lm of the main magnetic pole. The corner portions are formed so that the relation between the axial length Ln of the straight section of the main magnetic pole and the axial length Lc of the armature core satisfies $1.15\ Lc > Ln \geq Lc$.

Further, a direct-current motor comprises a main magnetic pole having an axial length of Lm, inclusive of the axial length Ln of a straight section, the main magnetic pole having corner portions which are respectively located at both ends of the straight section, the corner portion having a length R in the axial direction, and an armature core which is rotatably supported opposite to the main magnetic pole and has an axial length of Lc. The relation between the axial length Lm of the main magnetic pole and the axial length Lc of the armature core is set to satisfy substantially $Lm/Lc = 1.4$ and simultaneously the relation between the axial length Lm of the main magnetic pole and the axial length R of the corner portion satisfies $0.15\ Lm \geq R > 0.1\ Lm$.

Further, an auxiliary magnetic pole which has an axial length of Lp is provided on the magnetizing side of the main magnetic pole in such a manner that the axial length Lp of the auxiliary magnetic pole is set equal to the length Ln of the straight section of the main magnetic pole.

In the direct-current motor thus constructed, the corner portions are formed so that the relation between the axial length Ln of the straight section of the main magnetic pole and the axial length Lc of the armature core satisfies $1.15\ Lc > Ln \geq Lc$, whereby the axial length of the corner portion is set greater to the extent that the performance should not be lowered.

Moreover, the relation between the axial length Lm of the main magnetic pole and the axial length Lc of the armature core is set to substantially $Lm/Lc = 1.4$, and the corner portions are formed so that the relation between the axial length Lm of the main magnetic pole and the axial length R of the corner portion satisfies $0.15\ Lm \geq R > 0.1\ Lm$, whereby the axial length R of the corner portion is increased to the extent that the performance should not be lowered.

Further, the auxiliary magnetic pole having an axial length of Lp is provided on the magnetizing side of the main magnetic pole in such a way that the axial length Lp of the auxiliary magnetic pole is made equal to the length Ln of the straight section of the main magnetic pole, whereby the magnetic flux on the side of the main magnetic pole is effectively utilized.

BRIEF DESCRIPTION OF THE DRAWINGS

FIG. 1A is a side sectional view; and FIGS. 1B and 1C are bottom views;

FIG. 4A is a side sectional view; and FIG. 4B is a bottom view.

DETAILED DESCRIPTION OF PREFERRED EMBODIMENTS

Embodiment 1

Figure 1A:
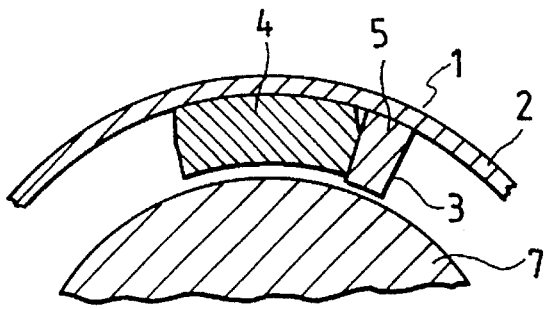
FIGS. 1A to 1C are structural diagrams of a field device for a direct-current motor as a first embodiment of the present invention, particularly.
Figure 1B:
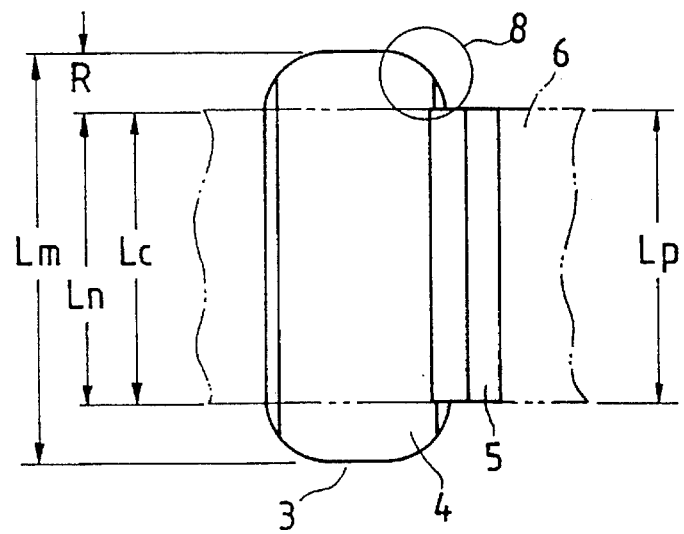
Figure 1C:
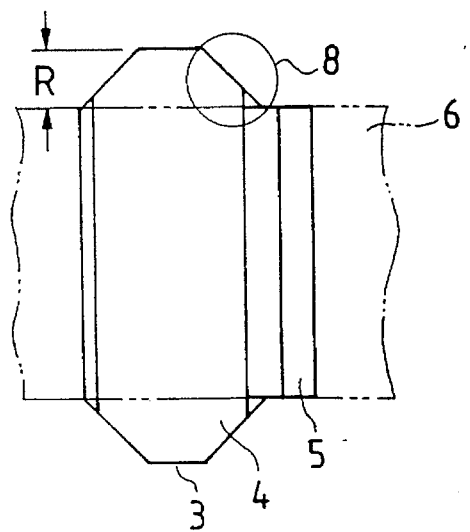
Figure 2:
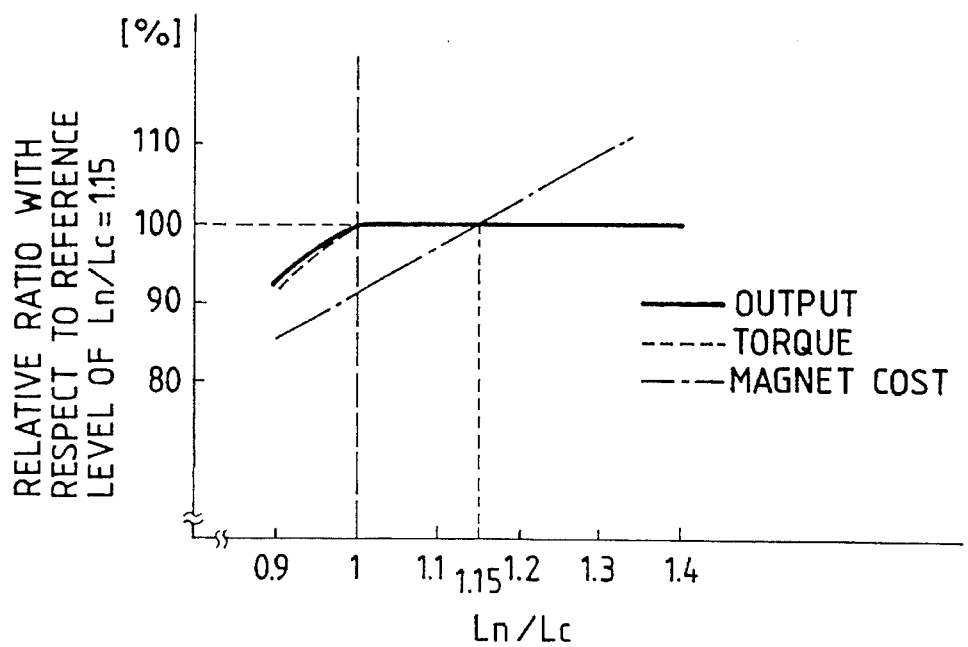
FIG. 2 is a characteristic diagram of the direct-current motor according to the first embodiment of the present invention.

FIGS. 1A to 1C are structural diagram of a field device for a direct-current motor of the present invention. Particularly, FIG. 1A is a side sectional view; and FIGS. 1B and 1C are bottom views. FIG. 2 is a characteristic diagram of the direct-current motor as the first embodiment of the present invention. In these drawings, reference numerals 1 to 8 designate parts similar to those in the conventional device and the description of them will be omitted. Incidentally, Lp represents the axial length of the auxiliary magnetic pole 5. According to the first embodiment of the invention, the corner portions 8 are chamfered as shown in FIG. 1C or the axial length of the corner to R is set as shown in Fig. 1B so that the axial length of the straight section of the main magnetic pole 4 are substantially equal to the axial length Lc of the armature core 6 (i.e. it satisfies Ln=Lc).

When the armature 7 supported on the inner periphery of the field pole 3 in the field device of the direct-current motor thus constructed is supplied with power, it is subject to the excitation force of the main magnetic pole 4 and rotates. The cubic volume of the magnet is decreased by chamfering the corner portions 8 of the main magnetic pole 4 formed from a ferrite permanent magnet or otherwise increasing the axial length R of the corner and the magnetic flux quantity is reduced to that extent. However, the performance will never be lowered even though the corner portions 8 are cut down because the magnetic flux in the corner portions 8 in the region Lm>Lc of the magnet is not effectively acting on the armature 7.

The characteristics of the main magnetic pole according to the first embodiment of the invention will subsequently be shown in FIG. 2, which refers to a case where a permanent magneto direct-current motor has an outer diameter of 74 φ (not shown) and a reduction mechanism engaging with an output shaft having six magnetic poles.

In FIG. 2, Ln/Lc=1.15 corresponds to the level of chamfering quantity at which the magnet of the conventional device is prevented from being chipped and the like. With Ln/Lc=1.15 as a reference level, the output and the torque both begin to lower when Ln/Lc becomes not greater than 1. Moreover, the shorter the Ln, that is, the greater the chamfering quantity or the axial length R of the corner, the lower the magnet cost becomes.

Therefore, the field device can be made more lightweight and less costly than the conventional one by setting the chamfering quantity or the axial length R of the corner in such a manner as to make the relation between the length Ln of the straight side section of the main magnetic pole 4 and the axial length Lc of the armature core 6 satisfy 1.15 Lc>Ln≧Lc.

Embodiment 2.

Figure 3:
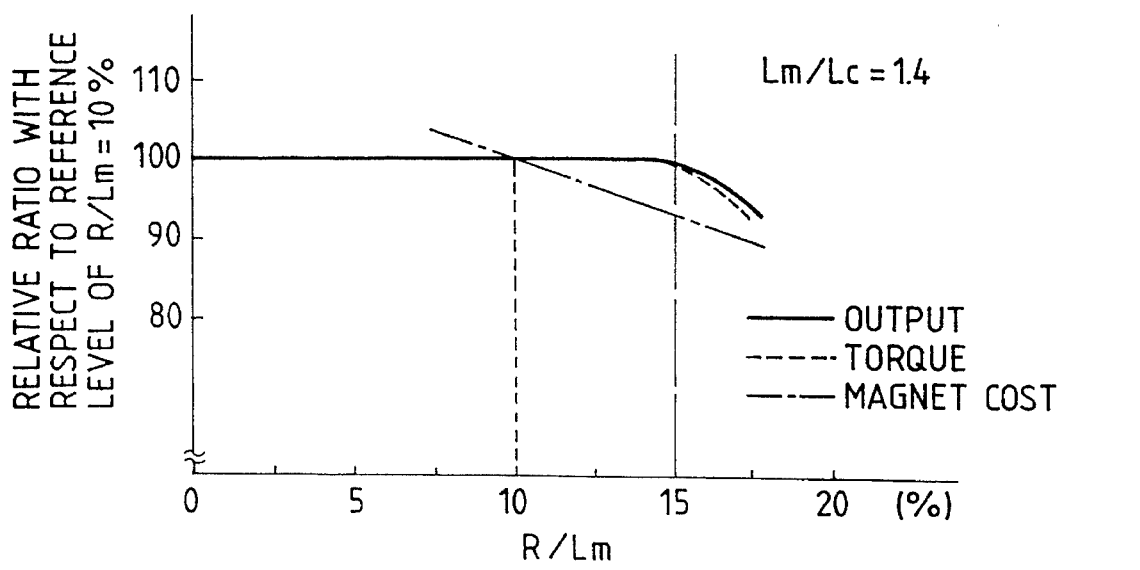
FIG. 3 is a characteristic diagram of another direct-current motor according to a second embodiment of the present invention.
Figure 4A:
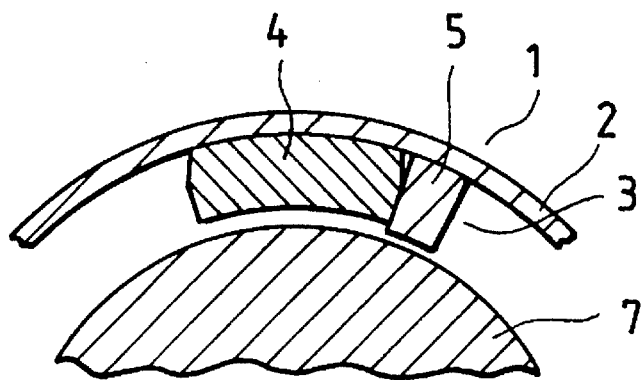
FIGS. 4A and 4B are structural diagrams of a field device for a conventional direct-current motor, particularly.
Figure 4B:
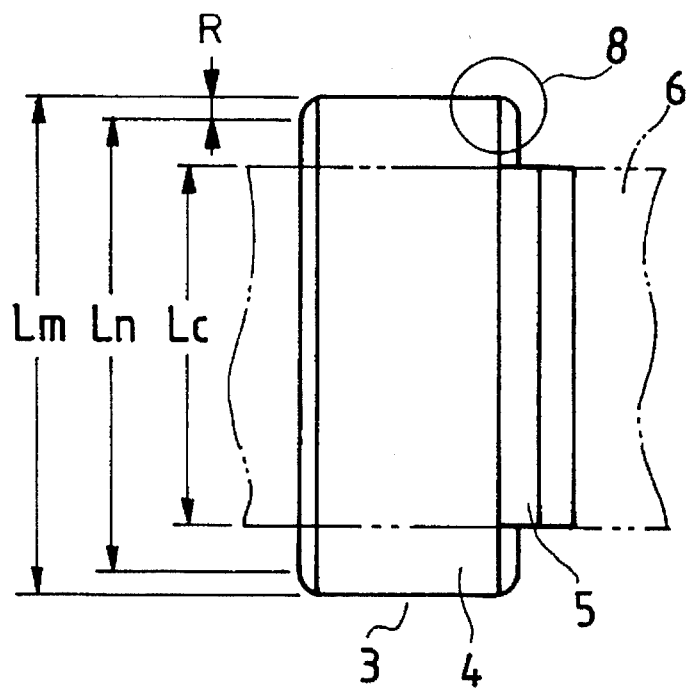

FIG. 3 is a characteristic diagram of another direct-current motor as a second embodiment of the present invention. The construction of the field device of this direct-current motor is similar to what is shown in FIG. 1A to 1C.

When consideration is given to the relation between the chamfering quantity of the corner portions 8 or the axial length R of the corner and the length Lm of the magnet, Lm/Lc=1.4 is optimum in view of balancing improvement in performance with weight reduction in the case of a direct-current motor satisfying Lm>Lc as disclosed in Japanese Postexamined Patent Publication (Kokoku) Hei-5-17783/(1993). FIG. 3 shows the relation between the chamfering quantity of the corner portions 8 of the main magnetic pole 4 or the axial length R of the corner and performance/cost when Lm/Lc=1.4. R/Lm=10% corresponds to the level of chamfering quantity at which the conventional magnet is prevented from being chipped and the like. From FIG. 3, the magnet cost is made reducible without lowering its performance by setting R to 0.1 Lm<R≦0.15 Lm with respect to Lm.

Embodiment 3.

Embodiment 3 relates to an auxiliary magnetic pole in the field device of a direct-current motor whose construction is similar to what is shown in FIGS. 1A to 1C. Since the magnetic flux over the straight section in the axial direction of the main magnetic pole 4 effectively and axially acts on the straight section with the cut-down corner portions 8 as shown in FIGS. 1B and 1C the axial length Lp of the auxiliary magnetic pole 5 is set equal to the length Ln of the straight side section of the main magnetic pole 4.

The present invention constituted as set forth above has the following effect:

The corner portions are formed so that the relation between the axial length Ln of the straight section of the main magnetic pole and the axial length Lc of the armature core satisfies 1.15 Lc>Ln≧Lc. The axial length of the corner portion is thus set greater to the extent that the performance should not be lowered, and the corner portions are largely cut down with the effect of making the whole device more lightweight and less costly by the amount of the material curtailed without changing the output characteristics.

The relation between the axial length Lm of the main magnetic pole and the axial length Lc of the armature core is set to substantially Lm/Lc=1.4, and the corner portions are formed so that the relation between the axial length Lm of the main magnetic pole and the axial length R of the corner portion satisfies 0.15 Lm≧R>0.1 Lm. The axial length R of the corner portion is increased to the extent that the performance should not be lowered, and the corner portions are largely cut down with the effect of making the whole device more lightweight and reducing the magnet cost by the amount of the material curtailed without changing the output characteristics.

Further, the auxiliary magnetic pole having an axial length of Lp is provided on the magnetizing side of the main magnetic pole in such a way that the axial length Lp of the auxiliary magnetic pole is made equal to the length Ln of the straight section of the main magnetic pole, whereby the magnetic flux on the side of the main magnetic pole is effectively utilized.

What is claimed is:

1. A direct-current motor comprising:
   a main magnetic pole having an axial length of Lm, inclusive of an axial length Ln of a straight section, the main magnetic pole having corner portions which are respectively located at both ends of the straight section; and
   an armature core having an axial length Lc which is shorter than the axial length Lm of the main magnetic pole, which is rotatably supported opposite to the main magnetic pole;
   wherein said corner portions are formed so that a relation between the axial length Ln of the straight section of the main magnetic pole and the axial length Lc of the armature core satisfies 1.15 Lc>Ln≧Lc.

2. A direct-current motor as claimed in claim 1, further comprising an auxiliary magnetic pole which has an axial length of Lp and is provided on the magnetizing side of the main magnetic pole in such a manner that the axial length Lp of the auxiliary magnetic pole is set equal to the length Ln of the straight section of the main magnetic pole.

3. A direct-current motor comprising:

a main magnetic pole having an axial length of Lm, inclusive of an axial length Ln of a straight section, the main magnetic pole having corner portions which are respectively located at both ends of the straight section, the corner portion having an axial length of R; and an armature core which is rotatably supported opposite to the main magnetic pole and has an axial length of Lc;

wherein a relation between the axial length Lm of the main magnetic pole and the axial length Lc of the armature core is set to satisfy substantially Lm/Lc=1.4 and that the relation between the axial length Lm of the main magnetic pole and the axial length R of the corner portion satisfies $0.15\ Lm \geq R > 0.1\ Lm$.

4. A direct-current motor as claimed in claim 3, further comprising an auxiliary magnetic pole which has an axial length of Lp and is provided on the magnetizing side of the main magnetic pole in such a manner that the axial length Lp of the auxiliary magnetic pole is set equal to the length Ln of the straight section of the main magnetic pole.

* * * * *